Sept. 30, 1941.  W. L. McGRATH  2,257,472
AUTOMATIC CONTROL SYSTEM
Filed Nov. 24, 1937
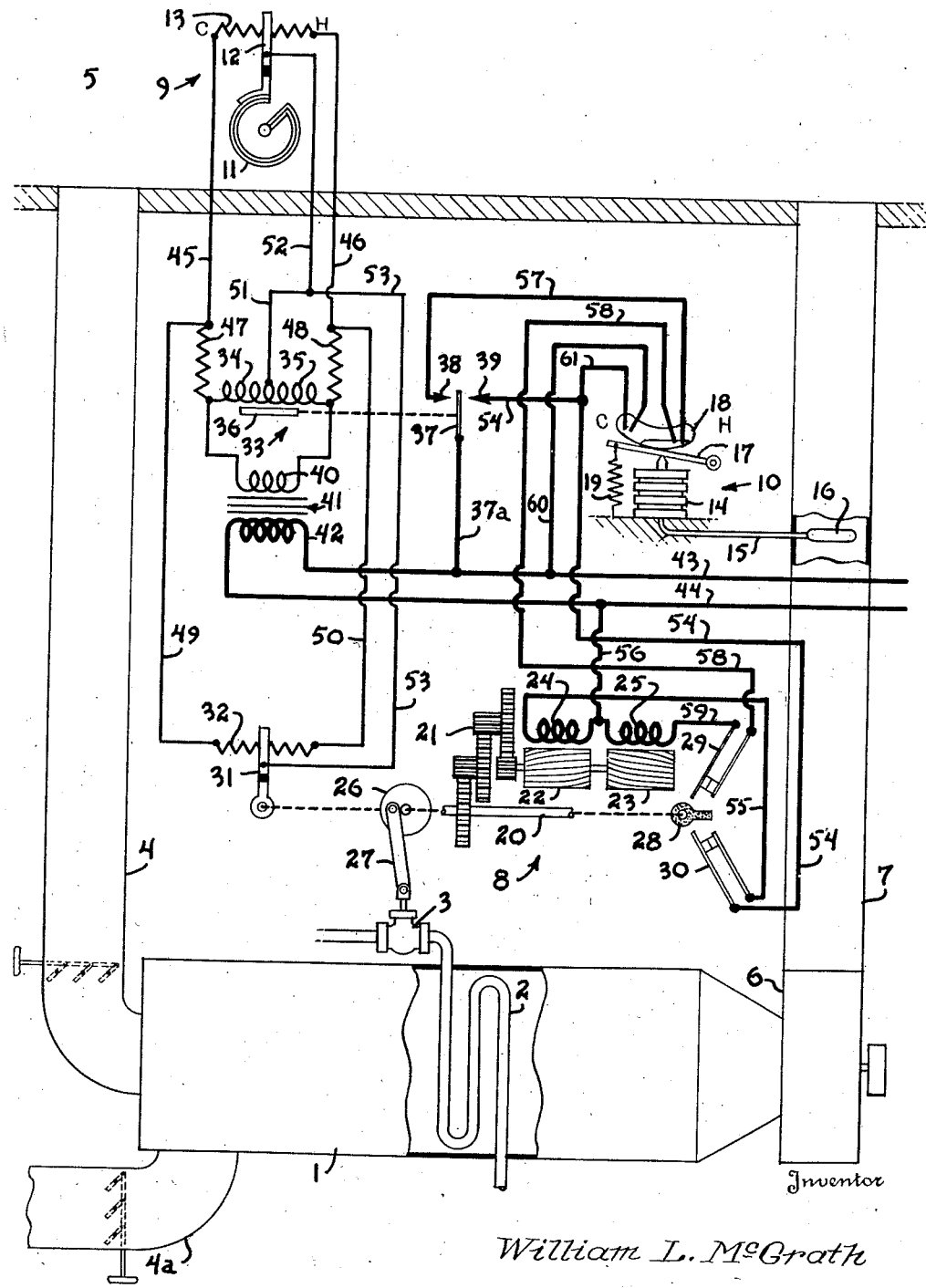
Inventor
William L. McGrath
By George H. Fisher
Attorney Patented Sept. 30, 1941

2,257,472

UNITED STATES PATENT OFFICE 2,257,472

AUTOMATIC CONTROL SYSTEM

William L. McGrath, St. Paul, Minn., assignor to Minneapolis-Honeywell Regulator Company, Minneapolis, Minn., a corporation of Delaware Application November 24, 1937, Serial No. 176,252

11 Claims. (Cl. 236—37)

This invention relates to automatic controllers and is more particularly concerned with automatic controllers of the graduating or modulating type.

In the control of warm air heating systems it is customary to control the amount of heat supplied to the heated air by means of a thermostat responsive to the temperature of the space being heated. In a system of this type, there is a considerable lag between the time at which the supply of heat to the air is changed and the time at which the resulting change in temperature of the space is felt at the space thermostat. For this reason, it has been usual to provide a proportioning type of control system for controlling the supply of heat to the heated air. This type of control system consists of a temperature controller which is provided with a thermostatic element which assumes a number of different positions for different values of temperature. This thermostatic element is arranged to actuate through a remote control system a valve or damper motor in a manner to cause the motor position to follow movements of the thermostatic element. Thus with this type of system there is for each value of space temperature a corresponding position of the valve or damper motor. Due to this arrangement, the supply of heat to the space will be modulated in a manner to just overcome the heat losses from the space and thereby maintain a constant space temperature.

In such warm air heating systems, it is not only necessary to control the valve or damper in a manner to maintain a constant space temperature, but is also necessary to provide an arrangement for preventing the temperature of the air being discharged to the space from falling below a predetermined value. For instance, if the air being discharged into the room should fall below 63° F., in certain installations, cold drafts will be noticed in the space being heated. This requires the use of a low limit controller which is responsive to the temperature of the discharged air and which cooperates with the space temperature controller in controlling the steam valve or damper motor. Heretofore, where the space temperature controller is of the proportioning or modulating type, it has been necessary to utilize a similar type of low limit controller to fit into the proportioning control system. The use of a proportioning type of low limit controller, however, has not proved satisfactory in some installations for the reason that the response of the low limit controller to a change in heating effect is almost instantaneous. In other words, the lag between the time that the position of the steam valve or damper is changed and the time at which the resulting change in temperature of the air is felt at the controller (process lag) is very slight. Due to the fact that for each position of the thermostatic element of a proportioning type of controller, there is a corresponding position of the damper or valve motor, the proportioning control system will in some cases oscillate or hunt when applied to a location in which this process lag is small. Thus with a proportioning type of low limit controller in some installations, if the discharge air temperature falls too low, the controller will cause opening of the steam valve or face dampers, which will result in an immediate rise in temperature of the discharge air. This rise in temperature will cause the thermostatic element of the low limit controller to assume a new position in which the supply of heat to the air is diminished. This will again cause the discharge air temperature to fall, thereby resulting in the supply of heat again being increased, and this cycling will continue indefinitely.

It is therefore an object of my invention to provide a control system for systems of this general type which permits the use of a modulating or proportioning type of primary controller, and which also utilizes a limit controller of a type which provides for modulating or graduating control and which is not subject to the inherent difficulties of a proportioning type of limit controller.

Another object of my invention is to provide a single control system in which two condition responsive devices cooperate to control a controller such as a steam valve and in which one of the condition responsive devices actuates the controller in a proportioning manner and in which the other condition responsive device actuates the controller in a floating manner.

Other objects lie in the various novel features and subcombinations of the control system and will be apparent from the following detailed description and the appended claims.

For a full disclosure of my invention, reference is made to the following detailed description and to the accompanying drawing, the single figure of which illustrates one form of my invention as applied to a warm air heating system.

Referring to the drawing, reference character 1 indicates a conditioning chamber enclosing a heating coil 2. This heating coil may be supplied with any suitable heating medium such as steam, and the flow of heating medium to this coil may be controlled by means of a valve as indicated at 3. The chamber 1 is connected by means of a return air duct 4 to a space to be conditioned 5, the duct 4 acting to convey air from the space 5 to the chamber. The discharge end of chamber 1 is connected to a fan 6 which discharges into a discharge duct 7 which conveys the heated air to the space 5. Fresh air for ventilation may be supplied to chamber 1 by means of duct 4a.

The valve 3 may be actuated by a reversible motor generally indicated as 8, this reversible motor being under the control of a potentiometer type space temperature controller 9 and a discharge air temperature low limit controller 10. The space temperature responsive controller 9 may be of known form, and is herein shown diagrammatically as comprising a bimetallic element 11 which actuates a slider 12, this slider cooperating with a resistance 13 to form a control potentiometer. Upon an increase in space temperature the slider 12 will be shifted to the right across the control resistance 13, while upon decrease in space temperature the slider 12 will be shifted in the opposite direction. This instrument may be so designed and adjusted that when the space temperature is 69° F., the slider 12 will engage the extreme left-hand end of resistance 13, while when the space temperature is 71° F., the slider will engage the extreme right-hand end of said resistance.

The discharge air temperature low limit controller is of the type having three controlling positions, two of which are contact making positions, and comprises a bellows 14 which is connected by a capillary tube 15 to a bulb 16 which is located within the discharge duct 7. This bellows, tube and bulb contain a suitable volatile fluid wherefore the pressure within the bellows will vary in accordance with changes in temperature at the control bulb 16. The bellows 14 may actuate a pivoted switch carrier 17 upon which is mounted a curved double ended type of mercury switch 18. A spring 19 is provided for urging the arm 17 against the bellows 14. This instrument may be so designed and adjusted that when the return air temperature falls to 63° F., the bellows 14 will be collapsed sufficiently by the spring 19 to tilt switch 18 to cause bridging the left-hand electrodes. When, however, the discharge air temperature rises to 65° the bellows will expand sufficiently to cause tilting of the mercury switch for bridging the right-hand electrodes thereof as shown. For values of temperature between 63° and 65° the mercury globule will disengage both sets of electrodes.

Referring to the reversible electric motor 8, this motor is shown diagrammatically as comprising a main operating shaft 20. This shaft is driven through a gear train 21 by means of a reversible electric motor consisting of a pair of armatures 22 and 23 which cooperate with field coils 24 and 25. It will be understood that the armature 22 and field coil 24 comprise a motor for driving the shaft 20 in one direction, while the armature 23 and the field coil 25 comprise a motor for driving the shaft 20 in the opposite direction. Upon the shaft 20 is mounted a crank 26, which crank is connected by a pitman 27 to the valve stem of the valve 3. The main operating shaft 20 also actuates a limit switch member 28 which is formed to actuate the limit switches 29 and 30. These limit switches are of known form and are provided for the purpose of deenergizing either the coil 24 or coil 25 when the motor is driven to an extreme limit of rotation, thereby preventing injury to the motor. The operating shaft 20 also actuates a slider 31, which slider cooperates with a resistance 32 to form a balancing potentiometer. This balancing potentiometer cooperates with the potentiometer of the space thermostat 9 for controlling a balancing relay 33, which relay controls the energization of the field coils 24 and 25.

Referring to the relay 33, this may be of any known form and is herein shown diagrammatically as comprising a pair of relay coils 34 and 35 which act to position an armature 36, which armature actuates a switch arm 37 cooperating with opposed contacts 38 and 39. It will be noted that the relay coils 34 and 35 are connected in series across the secondary 40 of a step-down transformer 41, the primary 42 of which is connected across line wires 43 and 44. Also connected across the transformer secondary 40 in parallel with the relay coils 34 and 35 are the potentiometer coils 13 and 32, the resistance 13 being connected in parallel with the relay coils 34 and 35 by means of wires 45 and 46 and the protective resistances 47 and 48. The potentiometer resistance 32 is connected in parallel with the relay coils by means of wires 49 and 50 which join the wires 45 and 46. The connected ends of the relay coils 34 and 35 are connected by means of wires 51, 52, and 53 to the potentiometer sliders 12 and 31. This arrangement, it will be noted, divides the resistances 13 and 32 into two portions, one portion of each being in parallel with one of the relay coils, and the other portion of each being in parallel with the other relay coil. A movement of either the slider 12 or the slider 31 across its resistance will therefore vary the relative amounts of resistance in parallel with the relay coils 34 and 35 and will therefore vary the relative amounts of current flowing through these two coils.

With a warm air heating system of this type, it is not only necessary to maintain a uniform space temperature but it is also necessary to prevent the temperature of the air being discharged into the space from falling below a predetermined value. In practice, it has been found that if the temperature of the discharged air falls below 63° a drafty condition will be experienced within the heated space. For this reason the low limit controller 10 is provided, which acts to prevent the temperature of the discharged air from falling below this value. Under normal conditions, the temperature of the discharged air will be above 65° F. due to the action of the heating coil and consequently the mercury switch 18 of the low limit controller 10 will be positioned for causing bridging of the right-hand contacts as shown.

With the parts in the position shown, the space temperature is at an intermediate value such as 70° F. as indicated by the slider 12 of the thermostat 9 engaging the mid portion of the resistance 13. For this position of the slider 12 the motor has driven the shaft 20 to mid-position in which the slider 31 engages the mid-portion of the balancing resistance 32. For these positions of the sliders 12 and 31, the left halves of the potentiometer resistances are connected in parallel with the relay coil 34 and the right-hand halves of these resistances are connected in parallel with the relay coil 35. Due to an equal amount of resistance being in parallel with each relay coil, these coils are equally energized, this resulting in the armature 36 assuming a mid-position in which the switch arm 37 is disengaged from the contacts 38 and 39. Inasmuch as for this position of the motor shaft 20 the valve 3 is half open, the temperature of the discharge air is above 65° and therefore the mercury switch 18 of the limit controller 10 is tilted to the position shown where the right-hand contacts thereof are bridged.

If the space temperature should fall, the slider 12 of the thermostat 9 will be shifted to the left across the resistance 13 which acts to reduce the portion of this resistance which is connected in parallel with the relay coil 34 and to increase the portion of this resistance which is connected in parallel with the relay coil 35. This will act to decrease the current flow in relay coil 34 and to increase the flow through relay coil 35 which results in the armature 36 shifting to the right, thereby bringing the switch arm 37 into engagement with the contact 39. Engagement of switch arm 37 with the contact 39 will energize the motor field 24 by a circuit as follows: line wire 43, wire 37a, switch arm 37, contact 39, wire 54, limit switch 30, wire 55, motor field 24 and wire 56 to the line wire 44. Energization of the motor field 24 will cause rotation of the shaft 20 in a clockwise direction, which causes opening movement of the valve 3. This clockwise rotation of the shaft 20 also shifts slider 31 towards the right across the balancing resistance 32, thereby decreasing the portion of this resistance which is in parallel with the relay coil 35 and increasing the portion thereof which is in parallel with the relay coil 34. This action therefore tends to balance out the initial unbalancing action on the relay coils 34 and 35 caused by movement of the thermostat slider 12 across the resistance 13. When the movement of the slider 31 across the resistance 32 is sufficient to completely balance out the initial unbalancing action of the controller 9, the relay coils 34 and 35 will again become equally energized, which causes the switch arm 37 to disengage the contact 39 thereby de-energizing the motor field 24, which results in the maintaining of the valve in this new position.

Upon an increase in space temperature it will be apparent that the slider 12 of the thermostat 9 will be shifted to the right across the resistance 13, which will cause increase in energization of the relay coil 34 and decrease in energization of the relay coil 35 which causes engagement of switch arm 37 with the contact 38. This action will result in energization of the motor field 25 for causing the valve to be driven towards closed position. The energizing circuit for motor field 25 is as follows: line wire 43, wire 37a, switch arm 37, contact 38, wire 57, mercury switch 18, wire 58, limit switch 29, wire 59, motor field 25 and wire 56 to line wire 44. This action will cause closing movement of the valve to a point at which the accompanying movement of the balancing potentiometer rebalances the relay 33.

From the foregoing description, it should be apparent that so long as the return air temperature is above 65° the space temperature responsive thermostat 9 will be under full control of the valve 3 and will vary the valve opening immediately in accordance with changes in temperature of the space, the degree in variation of the valve opening being dependent upon the degree of temperature change. With this arrangement, it will be noted that the opening or closing movement of the valve is determined by the thermostat and the motor will stop with the valve in a new position before the change in temperature caused by the shifting of the valve is felt at the thermostat. Therefore, even though a considerable time may elapse between the time at which the valve is set at a new position and the time at which the change in temperature is felt in the space, just the proper amount of heat will be supplied to the space to maintain a constant space temperature.

In mild weather when the heat losses from the building are small, or when the internal heat gain of the space is large due for instance to a large number of persons congregating in the space, only a small amount of heat must be supplied to maintain the desired space temperature. Under such conditions the space temperature may rise to such a point that the thermostat 9 closes the steam valve to such an extent that the temperature of the delivered air falls below 65° F. Upon the occurrence of this condition, the bellows 14 of the limit controller 10 will contract sufficiently to cause the right-hand electrodes of the mercury switch 18 to be opened. As has been pointed out previously, these electrodes are in the energizing circuit for the motor field 25. When these electrodes are opened, therefore, the circuit for the motor field 25 will be broken and thus the motor is prevented from closing the steam valve any further. It will be noted that the limit controller 10 is responsive to the temperature of the discharge air, which temperature varies almost instantaneously upon change in position of the valve 3. Therefore, when the valve 3 is being closed under the action of the space thermostat 9, the decrease in discharge air temperature will be felt almost immediately by the low limit controller 10, and when this discharge air temperature falls below 65°, the right-hand electrodes of the mercury switch 18 will be almost immediately opened, which results in stopping the closing movement of the valve 3. Due to this quick response of the low limit controller 10 the valve will be prevented from closing and the discharge air temperature will be maintained at 65° even though the space thermostat 9 is attempting to completely close the valve.

If for some reason the discharge air temperature falls to 63° F. due, for instance, to falling in outside temperature, the left-hand electrodes of the mercury switch will be bridged by the mercury globule. This will energize the motor field 24 by a circuit as follows: line wire 43, wire 60, mercury switch 18, wire 61, wire 54, limit switch 30, wire 55, motor field 24, and wire 56 to line wire 44. This energization of motor field 24 will cause driving of the valve 3 towards open position. As the valve begins opening, the supply of heating medium to the coil 2 will be increased, which will cause an almost immediate rise in temperature of the air leaving the heating coil 2 and this rise in temperature will be felt almost immediately at the control bulb 16 of the limit controller 10. When this temperature rises above 63° F., the mercury switch 18 will be tilted sufficiently to cause disengagement of the left-hand electrodes by the mercury globule which will result in deenergizing the motor field 24 which leaves the valve in this new position.

In the event that the limit controller 10 prevents the degree of closing of the valve as required by the thermostat 9, the balancing potentiometer will not be adjusted sufficiently to rebalance the energization of the relay coils 34 and 35. It will be remembered that when the space thermostat 9 calls for less heating, the relay coil 34 is energized more highly than the relay coil 35 and hence the switch arm 37 will engage contact 38. Due to the failure of the balancing potentiometer to rebalance the current flows in these relay coils, the switch arm 37 will remain in engagement with the contact 38. If at this time the return air temperature rises due, for instance, to rising outside temperature, and rises to 65° F., a circuit will be completed for energizing the motor field 25 as follows: line wire 43, wire 37a, switch arm 37, contact 38, wire 57, right-hand electrodes of mercury switch 16, wire 53, limit switch 29, motor field 25 and wire 56 to line wire 44. This will result in driving of the valve towards closed position. Due to this closing movement of the valve, the supply of heating medium to the coil 2 will be decreased thereby resulting in an immediate decrease in temperature at the control bulb 16. When the temperature falls below 65° F. the bellows 14 will have contracted sufficiently to tilt the mercury switch for causing opening of the right-hand electrodes. This will break the energizing circuit for the motor field 25, which stops further closing movement of the valve.

From the foregoing description, it should be apparent that during light load conditions when the space temperature responsive thermostat is not calling for sufficient heat to maintain the discharge air temperature above 65° F., the low limit controller will come into action for preventing the discharge air temperature from falling below this value. It should further be noted that the low limit controller, when it comes into action, causes continuous driving of the motor in the proper direction until the change in temperature caused by a change in valve position bring the temperature back to the desired value. Due to the "floating" action of the low limit controller there is no definite relationship between return air temperature and valve position, and hence, even though the discharge air temperature varies quickly with changes in valve position, there will be no oscillation or hunting of the control system as might occur with a proportioning type of low limit controller.

If desired, a suitable timing device or interrupter such as shown in Patent No. 1,698,989 may be placed in wire 56 for causing the current flow to the motor field coils 24 or 25 to be intermittent for thereby slowing down the movement of the valve 3 and thus give a greater period of time for the change in temperature caused by movement of the valve 3 to react upon controller 10.

From the foregoing, it will be observed that my invention provides for the combination of two distinct types of control systems into a single composite control system, utilizing a proportioning type of control for maintaining proper conditions within the heated space and utilizing the "floating" type of control for preventing the temperature of the discharge air from falling below a predetermined value. It will be apparent that due to the large lag in time between the change in the supply of heating medium to the coil and the time at which the change in temperature is felt in the conditioned space, the proportioning type of control is preferable and is recognized as being the proper type of control for this application. For the control of the discharge temperature, however, wherein this process lag is very slight, the floating type of low limit control is superior to a proportioning type inasmuch as it operates satisfactorily and is not subject to the inherent difficulty found in proportioning systems in applications of this type. My invention therefore provides a single control system in which both a floating type of control and a proportioning type of control are combined, for thereby securing the best type of control sequence for the specific application of each control.

While I have shown a preferred form of my invention as applied to a warm air heating system, it will be understood that many modifications can be made in the specific arrangement of the controls and of the type of apparatus to which the controls are applied. I therefore do not wish to be limited to the specific embodiment shown, and desire to be limited only by the scope of the appended claims.

I claim as my invention:

1. In a control system, in combination, a control device, an electric motor for actuating said control device, a potentiometer controller, a relay device responsive to said potentiometer controller and arranged to cause operation of said electric motor in a manner to position said control device in accordance with the setting of said potentiometer controller, said relay device causing said electric motor to operate in either direction or to remain at rest, means including switching mechanism interposed between said relay device and said electric motor, said last mentioned means being arranged to selectively place said relay device in control of said electric motor or to place said relay device at least partially out of control of said electric motor, and causing operation of said electric motor to any one of a number of desired positions when said relay device is placed out of complete control of said electric motor.

2. In a condition control system, in combination, a condition changing device having a controller for varying the operation thereof, a first condition responsive means responsive to the condition of a medium for actuating said controller, said first condition responsive means being of the proportioning type wherein the controller position is varied proportionately to change in value of said condition, a second condition responsive means responsive to a condition influenced by said condition changer which condition changes in value quickly upon change in output of said condition changer, means actuated by said second condition responsive means for rendering said first condition responsive means operative to shift said controller in either direction when said second condition is within a predetermined range of values, while causing movement of said controller in a direction to satisfy said second condition responsive means when the second condition varies a predetermined amount from said predetermined range of values, said last mentioned means being also arranged to demand movement of said controller until the change in value of the second condition caused by such movement is sufficient to satisfy said second condition responsive means, and means for maintaining said controller in the position causing satisfaction of said second condition responsive means until either said first condition responsive means demands further movement of said controller in the same direction or said second condition changes in value.

3. In a condition control system, in combination, a condition changing device having a controller for varying the operation thereof, a first condition responsive means responsive to the condition of a medium for actuating said controller, said first condition responsive means being of the proportioning type wherein the controller position is varied proportionately to change in value of said condition, a second condition responsive means responsive to a condition influenced by said condition changer which condition changes in value quickly upon change in output of said condition changer, means actuated by said second condition responsive means for rendering said first condition responsive means operative to shift said controller in either direction when said second condition is within a predetermined range of values, while rendering said first condition responsive means inoperative to shift said controller in one direction only when said second condition varies from said predetermined range of values, and means for maintaining said controller in an intermediate position when said second condition responsive means renders said first condition responsive means inoperative to shift said controller in one direction.

4. In a condition control system, in combination, a condition changing device having a controller for varying the operation thereof, a first condition responsive means responsive to the condition of a medium for actuating said controller, said first condition responsive means being of the proportioning type wherein the controller position is varied proportionately to change in value of said condition, a second condition responsive means responsive to a condition influenced by said condition changer which condition changes in value quickly upon change in output of said condition changer, means actuated by said second condition responsive means for rendering said first condition responsive means operative to shift said controller in either direction when said second condition is within a predetermined range of values, while rendering said first condition responsive means inoperative to shift said controller in one direction only when said second condition varies from said predetermined range of values, said second condition responsive means being also arranged to cause movement of said controller in a direction to satisfy said second condition responsive means and to demand such movement until said second condition responsive means is satisfied, and means for maintaining said controller in the position causing satisfaction of said second condition responsive means until either said first condition responsive means demands further movement of said controller in the same direction or said second condition changes in value.

5. In a condition control system, in combination, a condition changer for changing the condition of a medium, reversible motor means for controlling said condition changer, said motor means including relay means having a part for causing movement of said motor means in one direction and another part for causing movement of said motor means in the opposite direction, a first condition responsive means responsive to a condition being controlled, follow-up means actuated by said motor means, said first condition responsive means and said follow-up means conjointly controlling said relay means in a manner to position said motor means in proportion to the prevailing value of said condition, a second condition responsive means responsive to a second condition influenced by said condition changer; said second condition responsive means comprising a multi-position switch positioned in accordance with the value of said second condition, and means controlled by said multi-position switch for rendering both of said relay parts operative to control said motor means when said second condition is at one value, while rendering one of said relay parts ineffective to cause movement of said motor means when said second condition is at another value.

6. In a condition control system, in combination, a condition changer for changing the condition of a medium, reversible motor means for controlling said condition changer, said motor means including relay means having a part for causing movement of said motor means in one direction and another part for causing movement of said motor means in the opposite direction, a first condition responsive means responsive to a condition being controlled, follow-up means actuated by said motor means, said first condition responsive means and said follow-up means conjointly controlling said relay means in a manner to position said motor means in proportion to the prevailing value of said condition, a second condition responsive means responsive to a second condition influenced by said condition changer, and means actuated by said second condition responsive means for rendering both of said relay parts operative to control said motor means when said second condition responsive means is satisfied, while rendering one of said relay parts ineffective and causing movement of said motor means in a direction to satisfy said second condition responsive means when said second condition varies in a predetermined direction and amount from the control point thereof, said second condition responsive means being arranged to demand movement of said motor means within its range of movement until it is satisfied, irrespective of the position of said motor means.

7. In a condition control system, in combination, a condition changer, reversible electric motor means in control of said condition changer, said electric motor means being of the type which may operate in either direction or remain stationary, a condition responsive controller responsive to a first condition, connections between said condition responsive controller and said electric motor means for causing said motor means to assume positions proportionate to the value of said first condition, said condition responsive controller being of the proportioning type wherein the electric motor means is caused to operate in proportion to change in value of said condition, a second condition responsive means responsive to a condition which is influenced by said condition changer, said second condition responsive means including means in the connections between said first condition responsive means and said motor means for rendering said first condition responsive means operative to cause movement of said electric motor means in either direction when said second condition is at a predetermined value, while rendering said first condition responsive means operative to cause movement of said electric motor means in one direction only when said second condition is at another value.

8. In a condition control system, in combination, a condition changer, reversible electric motor means in control of said condition changer, said electric motor means being of the type which may operate in either direction or remain stationary, a condition responsive controller responsive to a first condition, connections between said condition responsive controller and said electric motor means for causing said motor means to assume positions proportionate to the value of said first condition, said condition responsive controller being of the proportioning type wherein the electric motor means is caused to operate in proportion to change in value of said condition, a second condition responsive means responsive to a condition which is influenced by said condition changer, said second condition responsive means including means in the connections between said first condition responsive means and said motor means for rendering said first condition responsive means operative to cause movement of said electric motor means in either direction when said second condition responsive means is satisfied while rendering said first condition responsive means inoperative to cause movement of said electric motor means in one direction when the second condition varies in a predetermined direction from the control point thereof, said second condition responsive means being also arranged to demand movement of said electric motor means within its range of movement until it is satisfied, irrespective of the position of said electric motor means.

9. In a condition control system, in combination, a condition changer for changing the condition of a medium, reversible motor means for controlling said condition changer, said motor means including relay means having a contact for causing movement of said motor means in one direction and another contact for causing movement of said motor means in the opposite direction, a first controller, a follow-up means actuated by said motor means, said first controller and said follow-up means conjointly controlling said motor means in a manner to position said motor means proportionately to the condition of said first controller, a second controller for said motor means, said second controller being in the form of a multi-position switch and operative when in one position to render both of said relay contacts effective, and when in another position to disconnect one of said contacts.

10. In a condition control system, in combination, a condition changer for changing the condition of a medium, reversible motor means for controlling said condition changer, said motor means including relay means having a part for causing movement of said motor means in one direction and another part for causing movement of said motor means in the opposite direction, a first controller, a follow-up device actuated by said motor means, said first controller and said follow-up means conjointly controlling said motor means in a manner to position said motor means proportionately to the condition of said first controller, a second controller for said motor means, said second controller having three positions, a first in which both of said relay parts are rendered operative, a second in which one of said relay parts is rendered inoperative, and a third in which said one of said relay parts remains inoperative and in which said motor means is caused to operate in a direction opposite to that caused by said one relay part.

11. In a system of the class described, in combination, condition changing means for conditioning a stream of medium passing to a conditioned space, proportioning type means responsive to the space condition for controlling said condition changing means in a manner to vary the output thereof proportionately to the value of the space condition being controlled, and limit control means responsive to the condition of the stream of medium passing to said space for limiting the condition of said medium within a predetermined range of values, said limit control means acting to graduatingly vary the output of said condition changing means until said the limit control is satisfied irrespective of the actual output, and to maintain the output constant at the value causing satisfaction of said limit control means.

WILLIAM L. McGRATH.